US009832977B2

(12) United States Patent
Smith

(10) Patent No.: US 9,832,977 B2
(45) Date of Patent: Dec. 5, 2017

(54) PET TETHERING DEVICE

(71) Applicant: Oolie, LLC, Santa Barbara, CA (US)

(72) Inventor: Rashelle Smith, Santa Barbara, CA (US)

(73) Assignee: Oolie, LLC, Santa Barbara, CA (US)

( * ) Notice: Subject to any disclaimer, the term of this patent is extended or adjusted under 35 U.S.C. 154(b) by 0 days.

(21) Appl. No.: 15/492,759

(22) Filed: Apr. 20, 2017

(65) Prior Publication Data

US 2017/0303511 A1    Oct. 26, 2017

Related U.S. Application Data

(60) Provisional application No. 62/326,781, filed on Apr. 24, 2016.

(51) Int. Cl.
*A01K 15/04*    (2006.01)
*A01K 27/00*    (2006.01)
*A01K 13/00*    (2006.01)

(52) U.S. Cl.
CPC .......... *A01K 15/04* (2013.01); *A01K 13/001* (2013.01); *A01K 27/002* (2013.01); *A01K 27/004* (2013.01)

(58) Field of Classification Search
CPC ...... A01K 1/04; A01K 27/002; A01K 13/001; A01K 1/0263; A01K 1/0613; A01K 15/04
USPC .................. 119/756, 753, 788, 786, 787
See application file for complete search history.

(56) References Cited

U.S. PATENT DOCUMENTS

| 5,894,748 A | * | 4/1999 | Capperrune | A01K 1/04 70/16 |
| 6,164,245 A | * | 12/2000 | Johnson | A01K 1/04 119/712 |
| 6,374,771 B1 | * | 4/2002 | Zwickle | A01K 1/0353 119/28.5 |
| 6,543,390 B2 | * | 4/2003 | Lowery | A01K 1/0263 119/771 |
| 7,222,590 B2 | | 5/2007 | Haddad | |
| 7,921,815 B2 | | 4/2011 | Moran | |
| 8,430,066 B2 | | 4/2013 | Franklin | |
| 2008/0314336 A1 | | 12/2008 | Church et al. | |
| 2009/0314225 A1 | | 12/2009 | Moran | |
| 2013/0025545 A1 | * | 1/2013 | Munoz | A01K 13/001 119/756 |

* cited by examiner

*Primary Examiner* — Yvonne R Abbott-Lewis
(74) *Attorney, Agent, or Firm* — SoCalIP Law Group LLP; Mark A. Goldstein; Nikki M. Dossman

(57) ABSTRACT

There is disclosed a pet tethering device including: a platform, a harness, and a tether. The harness includes: a girth strap to position about the pet's waist, the girth strap including a first loop; a collar strap to position about the pet's neck, the collar strap including a second loop; and a back strap to position along the pet's back, the back strap including a top and a bottom, wherein the top is attached to the collar and the bottom is attached to the girth strap. The tether includes: a first end attached to the platform; and a second end including an attachment device, wherein the second end is threaded through the first loop and the attachment device is attached to the second loop when the harness is positioned on the pet.

21 Claims, 3 Drawing Sheets

© 2017 Oolie, LLC

PET TETHERING DEVICE

RELATED APPLICATION INFORMATION

This patent claims priority from provisional patent application No. 62/326,781 filed Apr. 24, 2016 which is incorporated by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates generally to pet tethering devices.

Description of the Related Art

Pet owners frequently need to restrain or confine a pet, for example dogs, for periods of time while they are away from home or when the pet is unsupervised to prevent potential damage to the pet or the environment surrounding the pet, such as the owner's belongings and home furnishings.

Approaches to restrain a pet typically involve cages, crates, or fenced-in areas either inside or outside the home. However, many domestic animals attempt to break out of such enclosures and can harm themselves in the attempt or break free and then harm their environment. Restraining pets in enclosures can create emotional distress for the animal. Also, animals recovering from surgery often need to wear a neck cone which limits their ability to move within an enclosure.

DETAILED DESCRIPTION

Figure 1:
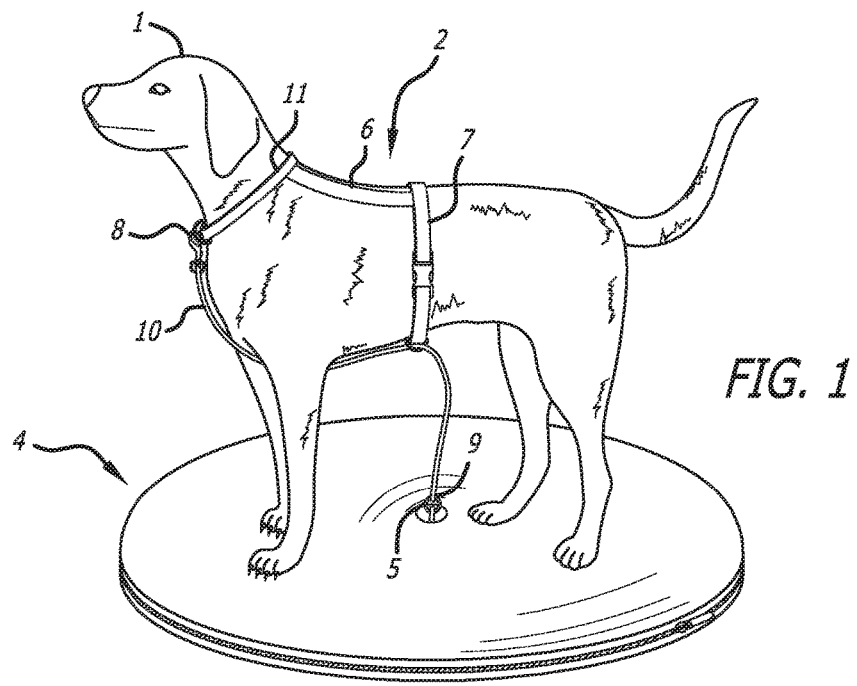
FIG. 1 is a schematic view of a pet tethering device.

Systems and devices for restraining an animal are described herein. The system is relatively small and portable, and can be used anywhere there is suitable floor space. The system is also tamper-resistant in that the components parts cannot be destroyed by the animal, as sometimes happens with cages, barriers and other types of restraints. The system also allows the pet to interact more freely with their environment as there is no enclosure.

A pet tethering device can include a platform, a tether and a harness. The harness can be placed on the animal and the tether can be attached to the platform and the harness in a manner effective to anchor the animal to the platform and prevent it from moving off the platform while restrained, while still allowing that animal to roll over, turn/spin around and walk/move about freely within a suitable range determined by the device.

A harness can include one or more girth straps, collar straps and/or back straps, and one or more of those straps can be of fixed length or adjustable. The harness can either include a collar strap for positioning around the pet's neck or be attached to the pet's own collar. The straps can have one or more loops configured to restrain an animal when the animal is wearing the harness and the harness is attached to the platform or other base.

The harness can be attached to the platform or other base using a tether. The length of the tether can be adjustable. The tether can include a first attachment device and a second attachment device, one or both of which may be rotatable to allow the animal to roll over, move/spin around and/or move/walk without getting stuck in the tether.

The tether can be attached to the harness and the platform or other base such that the pivot point on the harness is at or near the center-front of the underside of the pet rather than between the front legs, thereby allowing the size of the platform to be as small as possible in relation to the size of the animal. Minimizing the size of the platform can minimize the amount of space it takes up when placed on a floor inside a home or on the ground outside. The tether can be attached to at least one point on a collar strap and/or a girth strap.

Alternatively, the pivot point may be located more towards the front or rear end of the pet, including without limitation on or near the collar strap. The collar strap may further include a mechanism for allowing the animal to rotate around a pivot point on the collar or collar strap, including without limitation a clamp on the collar strap with a lead threaded through the clamp.

Pet tethering devices described herein are portable, prevent harm to the animal during normal use, can be made of sturdy materials, and can be used anywhere there is sufficient floor or ground space. The devices allow the animal to sit, stand, and move around to a certain degree without requiring a crate or other enclosure, while preventing the animal from destroying or otherwise harming its immediate environment while unsupervised. The pet tethering devices can prevent the animal from pulling so strongly in one direction that the restraint is subject to damage or destruction, or the animal itself is harmed. These pet tethering devices can be used for any suitable application, including without limitation temporary unsupervised restraint indoors or outdoors, house/potty training, bathing, socialization training, procedures designed to minimize or eradicate separation anxiety in pets or other animals, and to safely and calmly restrain injured/recovering animals.

As shown in FIG. 1, a pet tethering device for a pet 1 wearing a collar 11 includes a platform 4, a tether 10, and a harness 2 having a girth strap 7 and a back strap 6. The platform 4 can be a circular shape (or other shapes such as, for example oval, rectangular, square, pentagon, triangle, hexagon and other regular or irregular shapes) fabricated from a rigid material that resists flexion under the tension provided when a restrained animal pulls on it. The platform 4 can have a diameter slightly larger than the pet's length such that, when tethered to its center, the pet cannot leave the platform 4. The platform 4 can include a connector mechanism 5 located at or substantially near the center of the platform 4. The platform 4 can have a removable cover that can serve as a pet bed when the device is in use. An opening in the cover can provide access to the first connector mechanism 5 in the platform. In various embodiment, the cover includes a zipper, VELCRO or hook and loop fastening system, snaps or other attaching or closing system that enables the cover to be easily removed from the platform 4.

Materials suitable for the platform 4 include without limitation wood, hard plastic, or metal, with an exemplary thickness of 0.5-1 inches. The platform 4 can be of sufficient diameter, rigidity and thickness such that, when tethered to its center, the pet cannot leave the platform. For example, the platform 4 can be circular and the diameter of the platform can be equal to or greater than the pet's length when measured from the tip of its nose to the rear of its hind legs. In another example, the diameter of the platform 4 may be greater than or equal to the distance between the front and hind legs of the animal as measured from a point in front of the former and behind the latter.

Figure 2:
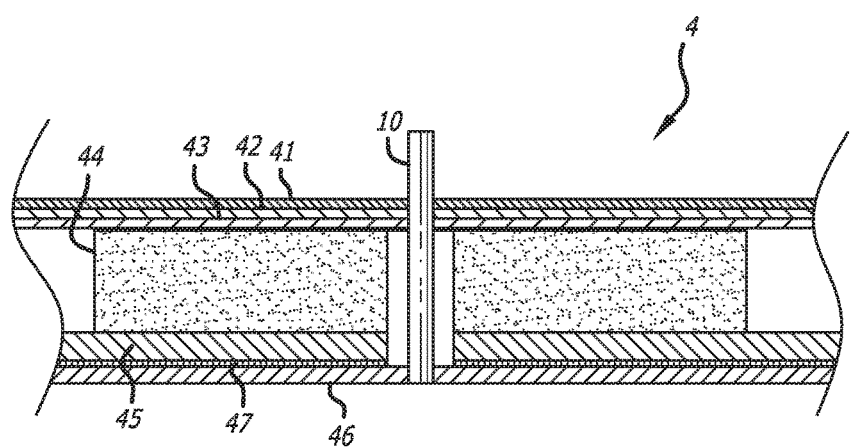
FIG. 2 is a cross-sectional schematic view of a platform of a pet tethering device.

The platform 4 can include a removable cover including without limitation a bed, pillow, rug or mat and other multi-layer arrangements. As shown in FIG. 2, the platform can be formed such that the pet is positioned on a soft material layer 41 of the removable cover. The removable cover can also include an absorbent material layer 42 and a heavy duty vinyl layer 43 that can be positioned under the soft material layer 41 and over a foam layer 44. These layers can have an opening to receive the tether 10 such that it can be attached to a rigid layer 45. For example, an attachment device (not shown) can be fixed to the rigid layer 45 such that the tether 10 can be attached to the attachment device. The attachment device can be a ring, having any suitable shape, such as a D-shaped or O-shaped, and can be formed of any suitable material, such as metal or plastic. The attachment device can be directly fixed to the platform, or can be fixed to the platform via a loop of material, such as metal, nylon, plastic, rubber and/or fabric. The attachment device or loop of material can be fixed to the platform by any suitable means such as one or more staples, screws, welds, or fusing of materials. The attachment device can be formed or attached to allow the tether to freely rotate, for example, via a swivel. An artificial leather layer 46 can be positioned under the rigid 45 to form a bottom of the cover, which can be removed via a zipper 47, or other suitable connector such as buttons, snaps or hook-and-loop closure system. In some embodiments, the platform 4 includes a water or food bowl, or a toy or other means of amusement built in, attached, or an opening or receptacle therefor. The cover can include more or fewer layers, and the layers can be formed of different materials.

In other embodiments, the platform can be foldable for portability, can have legs or other supports to raise the platform off the ground, and/or can have side walls that extend upwards from a perimeter of the platform. In other embodiments, the heating pad and/or a water or gel cooling pad can be inserted into the platform. In other embodiment, the platform can be covered with a disposable cover, such as a disposable sheet.

In other embodiments, the device can be detachably attached to a fixed surface such as a wall or a floor. For example, the platform can be attached to a floor or a wall via screws, snaps, hook-and-loop material, quick-release devices attached to loops, or any other suitable device. In another example, the platform is formed such that, when the pet steps on the device, air between the platform and the floor is expelled, creating a suction-cup-like effect between the platform and the floor. For example, the platform can have a concave-shaped surface (or slightly concave-shaped surface) adjacent the floor. When a pet steps on the device, the pet's weight deforms the concave-shaped surface so that air between the platform and the floor is expelled and the platform is pressed against the floor, creating a partial vacuum. The suction-cup-like effect detachably fixes the platform to the floor, such that some sliding of the platform is prevented when the pet moves on the device. Also, the platform can be formed of a material or covered with a material that has a compressible and/or adhesive quality that detachably fixes the platform to the floor. For example, the material can be artificial leather, vinyl, foam, latex, rubber or any other suitable material.

Figure 3:
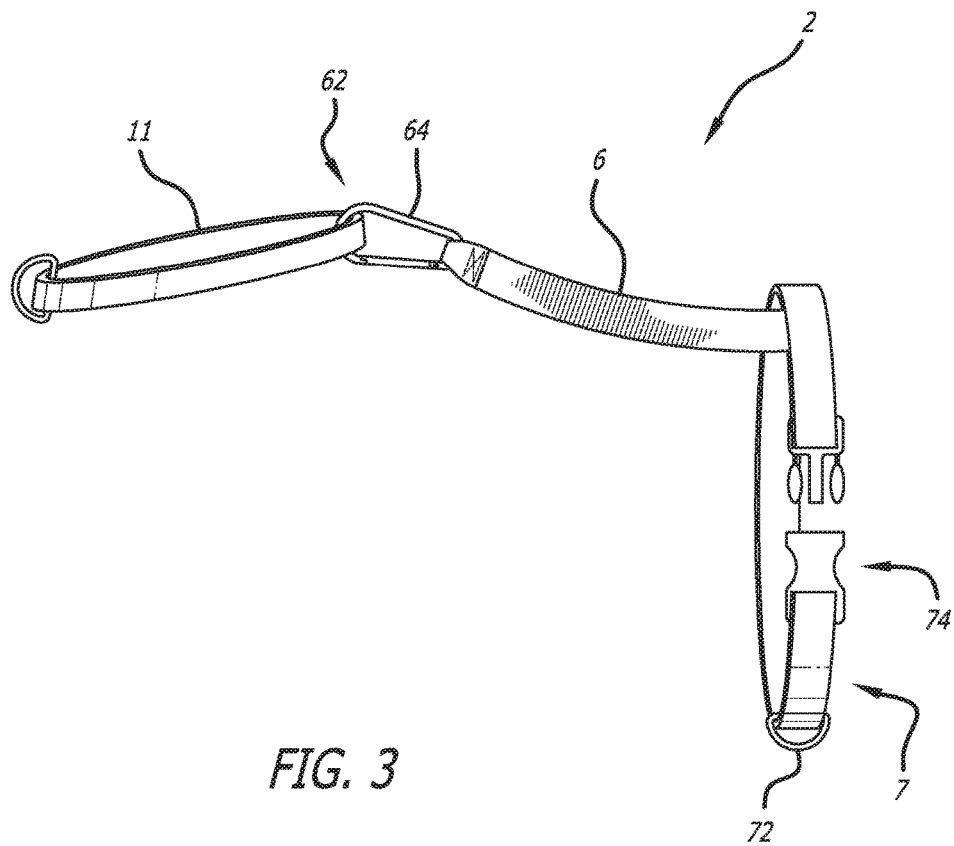
FIG. 3 is a schematic view of harness.

As shown in more detail in FIG. 3, the harness 2 includes a girth strap 7 having a tether loop 72, and a back strap 6 having a collar loop 62 and connected to the girth strap 7 such that, when in use, the back strap 6 is adjacent to a surface on the pet's back. The tether loop 72 on the girth strap 7 is located underneath the animal between the front and back legs, and can be formed of metal, nylon, plastic, or any other suitable material. The collar loop 62 on the back strap 6 is located at or near the neck of the animal and near a collar worn by the pet, and can be formed of metal, nylon, plastic, or any other suitable material. The harness 2 can be adjustably positioned around the pet's midsection by fastening a closure 74 on the girth strap 7, such as a buckle, clip, or snap, and secured to the pet's collar via the collar loop 62 to prevent the pet from being able to escape the harness. Adjustments to the harness 2 can be made at any suitable point, including without limitation via the back strap 6 and/or the girth strap 7. Materials suitable for the harness 2 include without limitation nylon, plastic, fabric, metal or rubber.

Suitable connectors 64 for securing the harness 2 to the pet's collar via the collar loop 62 can be used, including without limitation a buckle, clip, hook-and-loop device or other type of self-adhesive strip capable of forming a loop around the pet's collar. For example, the collar loop 62 can opened and slipped around a collar worn by the pet, and then closed. An advantage of this embodiment of the harness 2 is that the pet is not required to wear two devices, both its own collar and a collar strap of a harness around its neck.

Alternatively, in another embodiment the harness can have an adjustable collar strap, where the back strap is attached to the collar strap. When the harness is positioned on the pet, the collar strap can be secured around a neck of the pet using a suitable connector, such as a buckle, snap, or clip. The collar strap can also include an attachment mechanism for attachment to the tether 10. In this embodiment, the pet need not be wearing a collar, because the harness is not attached to the pet's collar.

Referring to both FIGS. 1 and 3, a first end 9 of the tether 10 can be attached to the connector mechanism 5 of the platform 4. The second end 8 of the tether 10 is threaded through the tether loop 72 positioned underneath the pet and pulled towards the front of the pet to be attached to the pet's collar 11 or a collar strap. If the second end 8 is attached to the pet's collar, it can be attached to the ring typically provided on pet collars for attaching leashes or identification tags. Any suitable connector can be used for attaching the tether 10, including without limitation a detachable and/or rotatable swivel, clip, buckle, or bolt snap. In this embodiment, the tether 10 can slide freely through the tether loop 72 as the pet moves. When the pet moves forward or backward, the tether 10 is pulled down through the tether loop 72 due its attachment to the platform 4. The pet cannot move too far forward because the tether 10 will pull down on the collar 11 or collar strap. The pet cannot move too far backward because the tether 10 will pull down on the tether loop 72 and the collar 11 or collar strap. As such, the pet will not be able to move off the platform.

Alternatively, the tether is attached to the tether loop 72 on the girth strap 7 via second end 8.

The tether 10 is fabricated from any suitable material, including without limitation a suitable gauge of metal, nylon, plastic, rubber and/or fabric. The tether 10 is any suitable length that permits the animal to lie down, sit or stand fully and it can withstand force applied by the animal while restrained. In various embodiments, the length of the tether 10 prevents the pet from placing either its feet or head off the platform, or the length of the tether can allow the animal to move partially off the platform.

Figure 4:
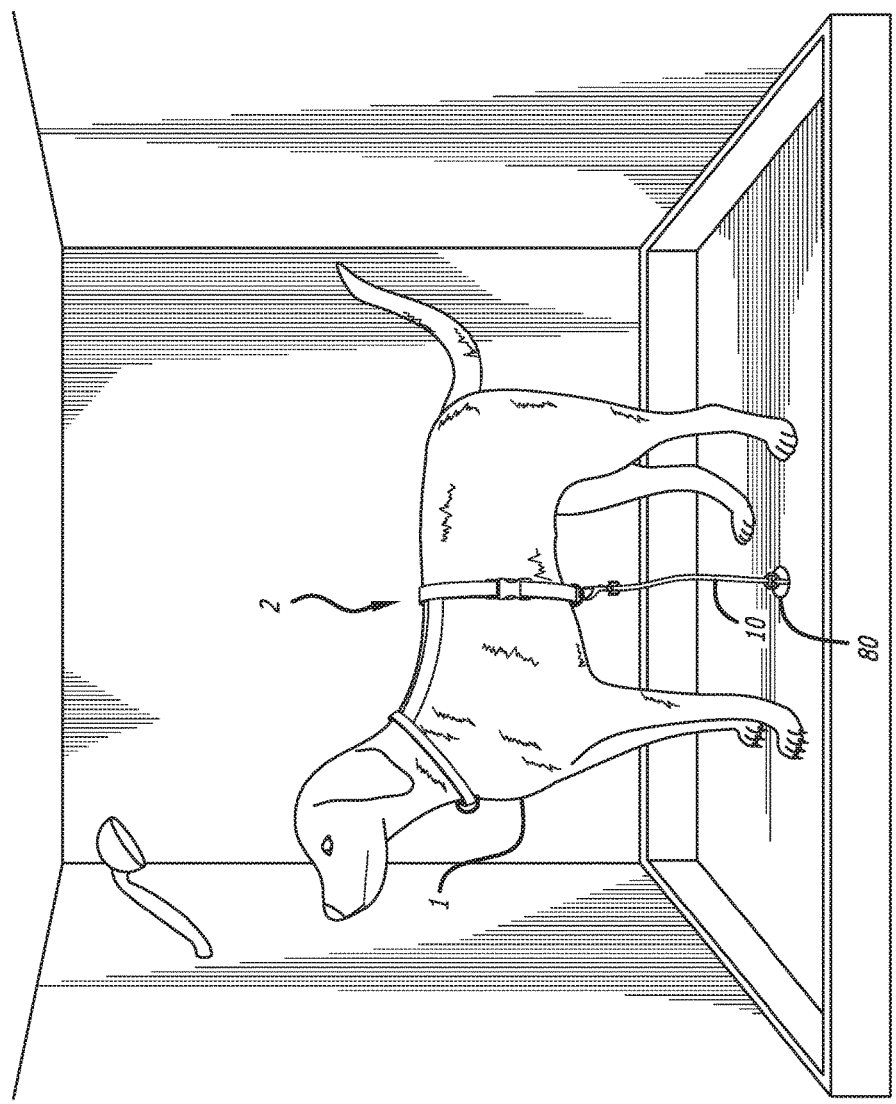
FIG. 4 is a schematic view of another pet tethering device.

Alternatively, rather than attaching the first end of the tether 10 to a platform, the first end of the tether is attached to an external surface 80, such as a bathtub or other suitably fixed attachment point, as shown in FIG. 4. For example, the harness 2 and tether 10 can be used to restrain the pet 1 when the pet is groomed.

One advantage of the pet tethering device having the harness configuration described herein is that if the pet backs up and begins to pull strongly on the tether from that direction, the pet will be forced to sit down and thus the pet cannot brace themselves. In this way the pet cannot put sufficient pressure on the tether to break free of the platform or external surface. If the pet pulls forward, due to the pet tethering device having the harness configuration described herein, the pets head is pulled down forcing it to lay down before it walks off of the platform or fixed attachment point. Another advantage is that the pet tethering device is more resistant to damage caused by chewing because the pet tethering device having the harness configuration described herein makes it difficult for a dog to reach any part of the system with its back grinding molars.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A pet tethering device comprising:
    a platform;
    a harness to position about a pet comprising:
        a girth strap to position about the pet's waist, the girth strap comprising a first loop;
        a collar strap to position about the pet's neck, the collar strap comprising a second loop; and
        a back strap to position along the pet's back, the back strap comprising a top and a bottom, wherein the top is attached to the collar strap and the bottom is attached to the girth strap; and
    a tether comprising:
        a first end attached to the platform; and
        a second end comprising an attachment device, wherein the second end is threaded through the first loop and the attachment device is attached to the second loop when the harness is positioned on the pet.

2. The pet tethering device of claim 1, wherein the first loop and the second loop are positioned on an undersurface of the pet when the harness is positioned about the pet.

3. The pet tethering device of claim 1, wherein the tether is positioned between the pet's front legs when the tether is threaded through the first loop and attached to the second loop.

4. The pet tethering device of claim 1, wherein the platform comprises a rigid substrate.

5. The pet tethering device of claim 1, wherein the first end of the tether is attached to a center of the platform.

6. The pet tethering device of claim 1, wherein the first end is rotatably attached to the platform.

7. The pet tethering device of claim 1, wherein a length of the collar strap, a length of the girth strap, a length of tether, and a length of the back strap are adjustable.

8. A pet tethering device comprising:
    a platform;
    a harness to position about a pet comprising:
        a girth strap to position about the pet's waist, the girth strap comprising a tether loop; and
        a back strap to position along the pet's back, the back strap comprising a top and a bottom, wherein the top comprises a collar loop to receive a collar worn by the pet and the bottom is attached to the girth strap; and
    a tether comprising:
        a first end attached to the platform; and
        a second end comprising an attachment device, wherein the second end is threaded through the tether loop and the attachment device is attached to the collar.

9. The pet tethering device of claim 8, wherein the tether loop is positioned on an undersurface of the pet when the harness is positioned about the pet.

10. The pet tethering device of claim 9, wherein the tether is positioned between the pet's front legs when the tether is threaded through the tether loop and attached to the collar.

11. The pet tethering device of claim 8, wherein the platform comprises a rigid substrate.

12. The pet tethering device of claim 8, wherein the first end of the tether is attached to a center of the platform.

13. The pet tethering device of claim 8, wherein the collar loop is openable to receive the collar.

14. The pet tethering device of claim 8, wherein a length of the collar strap, a length of the girth strap, a length of tether is adjustable, and a length of the back strap are adjustable.

15. The pet tethering device of claim 8, wherein a bottom surface of the platform is detachably attached to a fixed surface.

16. A pet tethering device comprising:
    a harness to position about a pet comprising:
        a girth strap to position about the pet's waist, the girth strap comprising a tether loop; and a back strap to position along the pet's back, the back strap comprising a top and a bottom, wherein the top comprises a collar loop to receive a collar worn by the pet and the bottom is attached to the girth strap; and a tether comprising:
  a first end attached to an external surface; and
  a second end comprising an attachment device, wherein the second end is threaded through the tether loop and the attachment device is attached to the collar.

17. The pet tethering device of claim 16, wherein the tether loop is positioned on an undersurface of the pet when the harness is positioned about the pet.

18. The pet tethering device of claim 17, wherein the tether is positioned between the pet's front legs when the tether is threaded through the tether loop and attached to the collar.

19. The pet tethering device of claim 16, wherein a length of tether is adjustable.

20. The pet tethering device of claim 16, wherein the first end is rotatably attached to the external surface.

21. The pet tethering device of claim 16, wherein a length of a length of the girth strap, and a length of the back strap are adjustable.

\* \* \* \* \*